United States Patent [19]
Komeno et al.

[11] Patent Number: 4,986,199
[45] Date of Patent: Jan. 22, 1991

[54] METHOD FOR RECOVERING WASTE GASES FROM COAL PARTIAL COMBUSTOR

[75] Inventors: Minoru Komeno, Yokohama; Motoaki Hirao, Tokyo; Toshiyuki Takeuchi, Yamato; Shunpei Nozoe, Urayasu; Hideki Takano; Katsunori Yoshida, both of Chiba, all of Japan

[73] Assignees: Kawasaki Jukogyo Kabushiki Kaisha; Kawasaki Steel Corporation, both of Kobe, Japan

[21] Appl. No.: 454,288

[22] Filed: Dec. 21, 1989

[51] Int. Cl.$^5$ .............................................. F23D 1/06
[52] U.S. Cl. ....................................... 110/347; 48/77; 48/210; 48/DIG. 2; 110/229; 110/264; 110/234
[58] Field of Search ..................... 48/77, 210, DIG. 2; 122/5; 110/229, 230, 264, 347, 341, 233, 234

[56] References Cited
U.S. PATENT DOCUMENTS

| | | | |
|---|---|---|---|
| 3,818,869 | 6/1974 | Blaskowski | 110/229 X |
| 4,569,680 | 2/1986 | Darling et al. | 48/77 |
| 4,806,131 | 2/1989 | Morihara et al. | 48/21 D |
| 4,823,742 | 4/1989 | Davis et al. | 110/229 X |

Primary Examiner—Edward G. Favors

[57] ABSTRACT

A method is proposed for recovering high-temperature exhaust gases of high inflammability in terms of carbonaceous concentration from the partial combustion, at atmospheric pressure or near atmospheric pressure, of a mixture of pulverized bituminous or subbituminous coal and air as oxidizer gas, enriched with oxygen gas in a combustor apparatus having a cylindrical combustion chamber with a tangential injection duct, through which the fuel mixture is introduced into the combustion chamber to develop into a rapidly swirling vortex optimizing burning over a short period of time. As a result, the high-temperature, inflammable exhaust gases are generated, of which the heat is recovered to produce steam in a boiler. After losing portion of their heat to the boiler, the inflammable gases, following purification by a filter and desulfurization unit, recovery for subsequent thermal use in boilers, metallurgical or other chemical processes. The ash and other non-combustible products present in the gases are caused to move out outwardly in the combustion chamber as molten slag, forming the outermost part of the vortex, and flow down along the inner wall of the combustor apparatus into its bottom where the slag is collected through a tapping port at the bottom.

3 Claims, 4 Drawing Sheets

METHOD FOR RECOVERING WASTE GASES FROM COAL PARTIAL COMBUSTOR

BACKGROUND OF THE INVENTION

(1) Field of the Invention

The present invention relates to recovery of high-temperature inflammable exhaust gases from the partial combustion of fuel and air in a combustor apparatus.

(2) Description of the Prior Art

Various combustor apparatus capable of generating high-temperature inflammable exhaust gases containing less non-combustible products, such as ash, suitable to burn a boiler, have been developed. Such gases are recovered from the partial combustion of a mixture of fuel and oxidizer air in a combustor apparatus, which may be designed as the first reaction zone of a boiler system to supply fuel to the second reaction zone. In the first reaction zone, the fuel mixture is burned at or above the slag fusion temperature, generally at atmospheric pressure or near atmospheric pressure, to produce combustible exhaust gases which are recovered and burned in the second reaction zone to produce steam.

Combustor apparatus for partial fuel combustion comprises a cylindrical combustion chamber and a tangential injection duct through which fuel mixtures, which may be pulverized coal carried with air, are injected into the combustion chamber. The fuel introduced through the tangential passage of the injection duct, upon entering the combustion chamber, develops into a rapidly swirling vortex. This rapid movement causes most of the ash and other non-combustible products present in the fuel mixture to move externally as molten slag, forming the outermost part of the swirling gaseous stream, and can be expelled from a slagging port mounted at the outside wall of the combustion apparatus. The central portion of the rapidly swirling vortex is recovered from the outlet port of the combustion chamber as high-temperature exhaust gases. The exhaust gases thus obtained contain substantial quantities of incompletely combusted by-products such as carbon monoxide and hydrogen, and are passed to the associated boiler or recycled for other applications.

However, the boiler would have poor burning on an air-fuel equivalence ratio of lower than 0.6. In conventional exhaust gas recovery method from the partial combustion of coal and air, combustion apparatus have been burned on mixtures of fuel and air as oxidizing gas with an air-fuel equivalence ratio in the range from 0.6 to 0.7. The resultant exhaust gases, recovered following partial combustion in the reaction chamber of the apparatus, have tended to turn out somewhat lacking in inflammability. These recovered gases, which may be used after cooling, have failed to provide efficient thermal energy when burned in a boiler. Experiments showed that the partial combustion at 0.7 air-fuel equivalence ratio produced waste gases of heating value ranging nor more than 200–500 kcal/Nm$^3$, depending on the kinds of coal making up the fuel mixtures.

Furthermore, conventional waste gas recovery methods have been proved to pose problems with coal gasification. Generally, requirements for gasification differ from one application to another in which the gases recovered are intended for. For high thermal energy, the gases must have an increased methane content, which means combustion under a pressure of over 20 kg/cm$^2$G. Facilities capable of operation at high reaction pressure levels add much to production costs.

SUMMARY OF THE INVENTION

The present invention has been proposed to provide a method of recovering waste gases free from the abovementioned drawback of difficulties with conventional processes.

It is therefore a primary objective of the present invention to provide an improved method for recovering high-temperature inflammable exhaust gases from the partial combustion of coal and oxidizing gas at atmospheric pressure or near atmospheric pressure, with the gases recovered used to produce steam or, after cooling, re-burned in metallurgical or other chemical processes.

The waste gas recovery method of this invention consists in causing a mixture of pulverized bituminous or subbituminous coal and air, enriched with oxygen gas, to undergo partial combustion at or near atmospheric pressure to generate high-temperature exhaust gases containing incompletely burned combustible by-products enough to insure high combustibility. The method insures optimized reaction due to the addition of oxygen gas, should the air-fuel equivalence ratio happen to fall short of 0.6.

The heat of the generated high-temperature gases would be high enough to produce steam in a boiler. After loosing part of their heat to the boiler, the exhaust gases are passed through a filter to remove the ash and other by-products contained in them. The filtered gases are then supplied to a desulfurization unit which in turn removes the sulfur and sulfur compounds from the fed gases before they are recycled as a useful fuel of enough combustibility in terms of carbonaceous concentration for use in boilers, metallurgical or other chemical processes.

Means are also provided to collect combustible by-products contained in the exhaust gases while they are in the combustion chamber or in a boiler, and recycle them back to the combustion apparatus for re-combustion, upgrading overall combustion efficiency. The recycle not only would reduce the amount of what would otherwise have to be disposed of as unusable slag. Also, reaction in the combustion chamber is such that 90% or more of the non-combustible by-products present in the gases are removed as molten slag more easily than in conventional methods.

Furthermore, the method of the present invention also increases efficiency because it can enable the exhaust gases from partial combustion to be used as both immediate thermal energy to produce steam, as in a boiler, and subsequent recycle for other applications. In addition, the method provides for easier control of combustion conditions, such as reaction temperature or the inflammability of exhaust gases to be generated in terms of their composition by varying the rate of oxygen gas added to the combustion chamber to be burned with the fuel mixture.

BRIEF EXPLANATION OF ACCOMPANYING DRAWINGS

Figure 3:
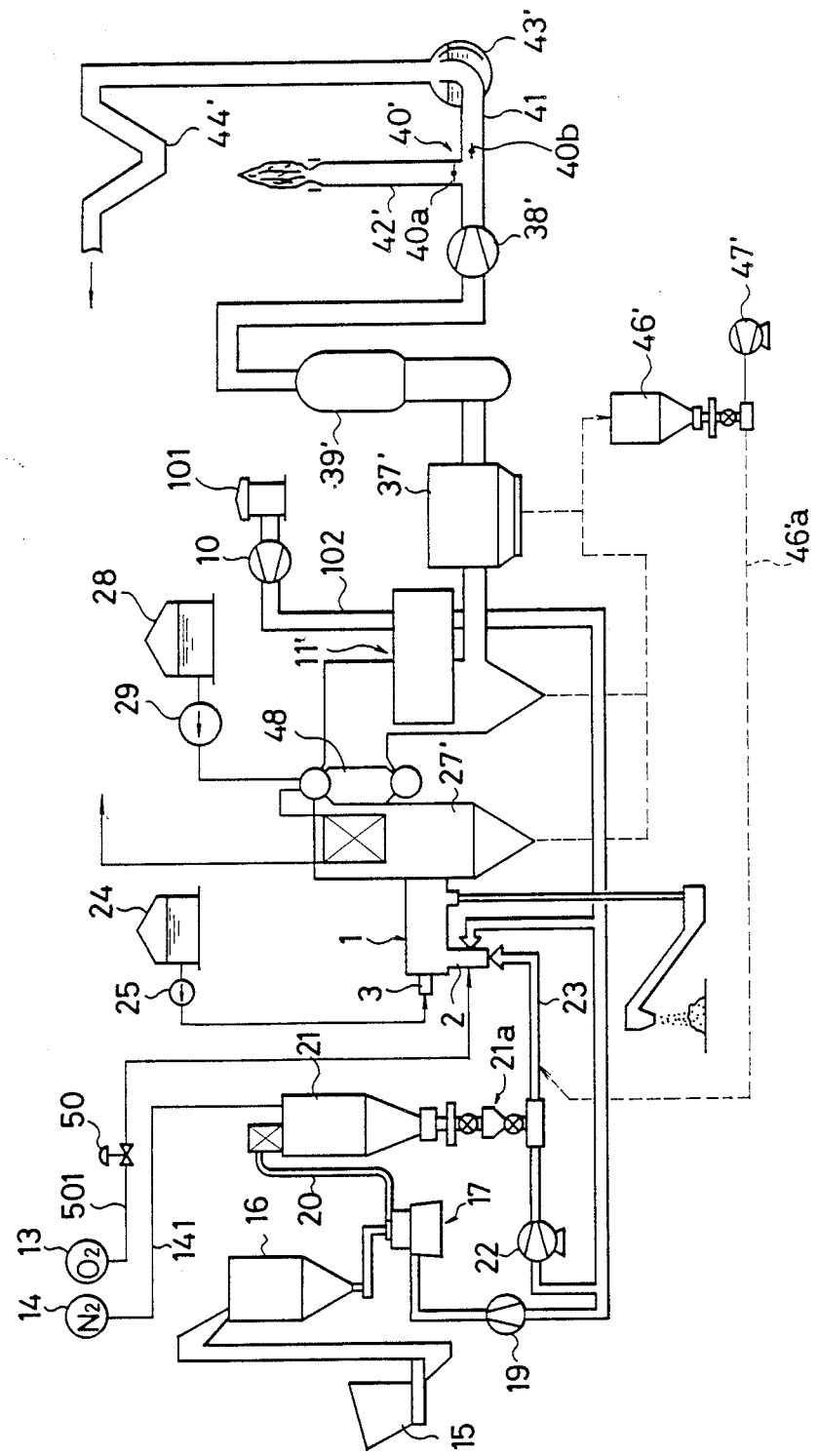
Figure 4:
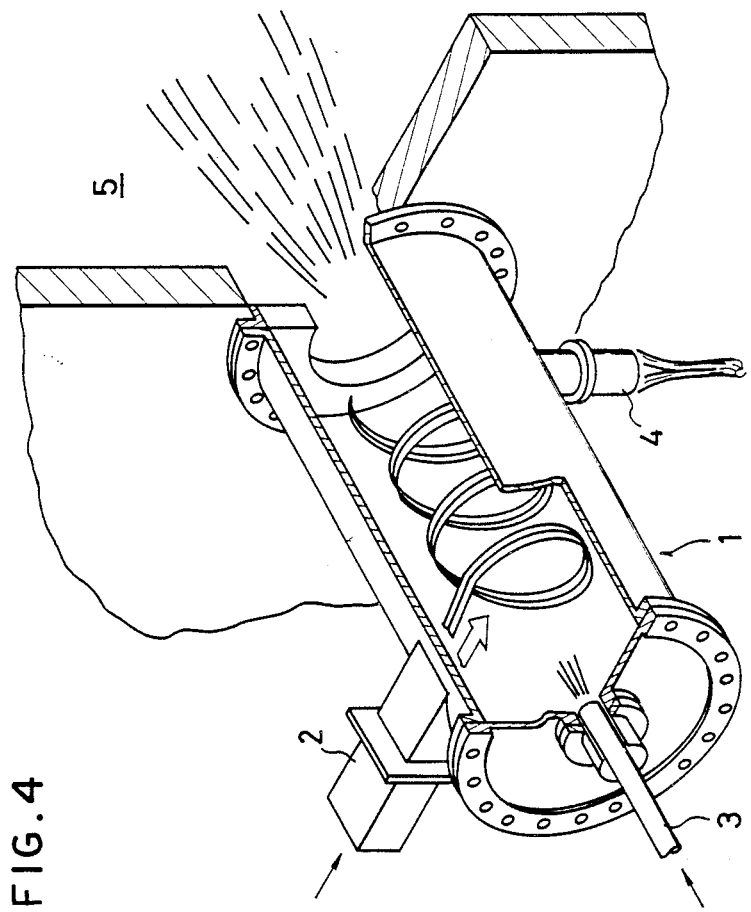

FIG. 3 is a flow chart showing another version of the method for recovering high-temperature inflammable exhaust gases from the partial combustion of fuel and oxidizer gas, enriched with oxygen gas, in a combustion apparatus with a boiler directly linked thereto, in accordance with the present invention; and FIG. 4 is a perspective view of a typical combustion apparatus for partial combustion of coal, with part broken away to unveil its inside structure.

DETAILED DESCRIPTION OF PREFERRED EMBODIMENTS

The method for recovering high-temperature inflammable exhaust gases from the partial combustion of a mixture of pulverized coal and oxidizer gas, enriched with oxygen gas, will be described in detail in conjunction with the accompanying drawings.

Figure 1:
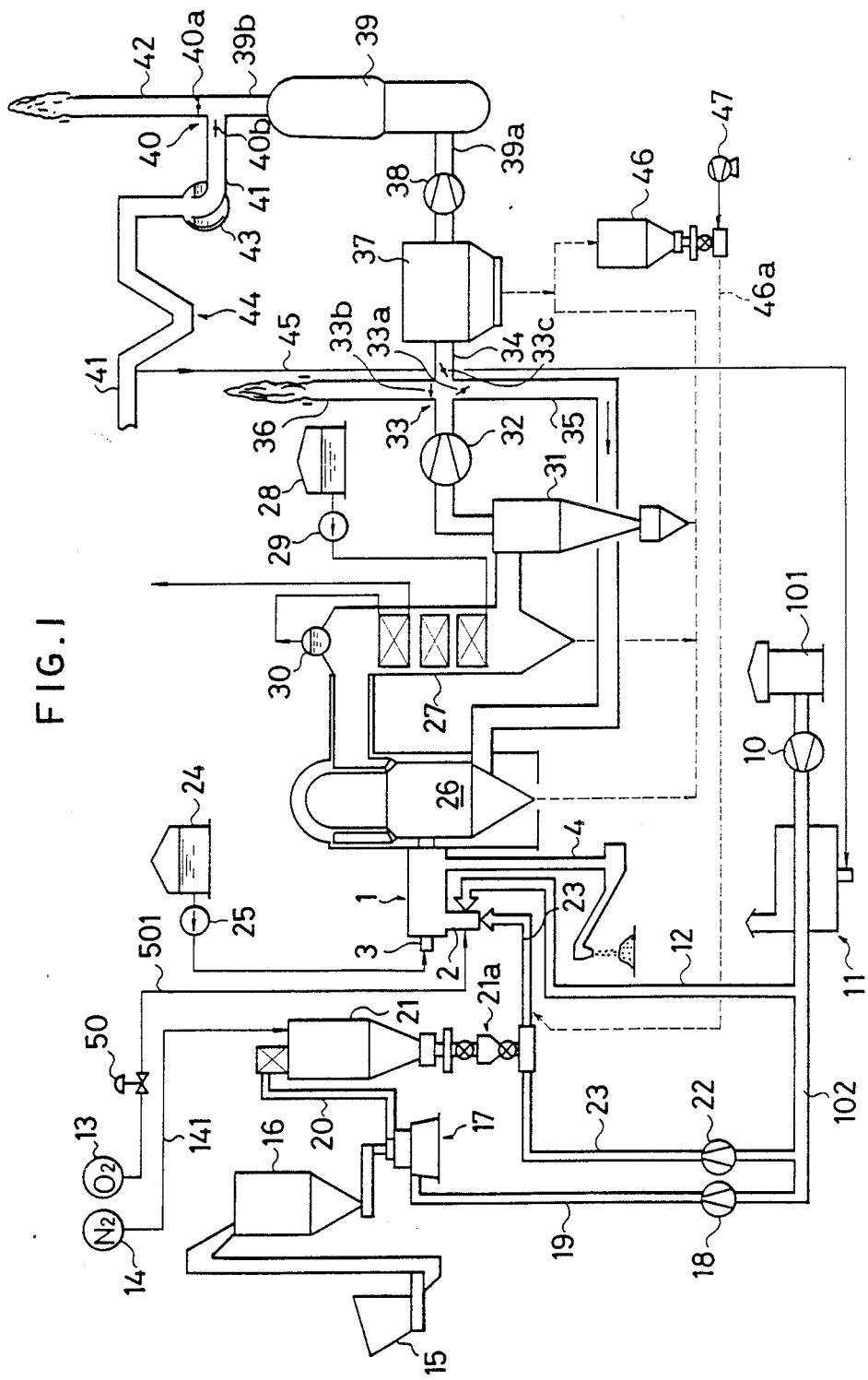
FIG. 1 is a flow diagram explaining a first version of the method for recovering high-temperature inflammable waste gases from the partial combustion of fuel and oxidizer gas, enriched with oxygen gas, in accordance with the present invention.

Referring first to FIG. 1, a first version of the method of the present invention may be implemented by using part of related facilities for coke oven gas which is unnecessary equipment when the blast furnace have been in shutdown. Because of this, some of the facilities must be used for unintended purposes or left unused at all.

In the drawing, a combustor apparatus 1, mounted in a horizontal position, comprises a cylindrical chamber having walls which define a reaction zone in the fuel-air mixture is ignited to undergo partial combustion. The combustion apparatus 1 carries therein an injection duct 2 through which the fuel-air mixture is injected into the reaction zone. The injection duct 2 is mounted to axially tangentially extend to the cylindrical wall of the combustor apparatus for the reason to be explained later.

The fuel may preferably be pulverized bituminous or subbituminous coal while the oxidizer gas may preferably be air enriched with oxygen gas, blended at a specific percentage to the coal with which it is to be burned in the reaction zone to provide a desired inflammability rate of exhausts. An oxygen gas supply 13 is connected to the injection duct 2 through a supply pipe 501 to feed the combustion apparatus 1 with oxygen gas. A flow control valve unit 50 may preferably be installed in the supply pipe 501 to control the supply to the injection duct 2.

The combustor apparatus 1 is also supplied with air through an air passage 12 that extends from a main supply line 102. A primary air supply 101 feeds the main supply line with air. An forced-draught fan 10 is mounted in the main supply line 102 to move the air therethrough to the injection duct 2. A heating device 11 is mounted on the main supply line 102 in such a manner as to heat the air from the primary air source 101.

A coal hopper 15 feeds bitsuminous or subbituminous coal to a coal pulverizer 17 through a coal silo 16, which in turn grinds the received coal into fine coal particles. The pulverized coal is then fed from the exit port of the pulverizer 17 into a pulverized coal silo 21 through a coal line 20, which stores supplied pulverized coal. An air passage 19 establishes a fluid flow relation between the pulverizer 17 and the main supply line 102 to supply the pulverizer with part of the air from the primary air source 101. A forced-draught mill fan 18 mounted in the air passage 19 to fed the air there through to propel the flow of pulverized coal with it from the pulverizer 17 into the pulverized coal silo 21.

A nitrogen gas supply 14 feeds nitrogen gas to the pulverized coal silo 21 through a supply line 141 to keep the stored pulverized coal in an inert environment. A fuel supply passage 23 interconnects the fuel injection duct 2 and the discharge port of the pulverized coal silo 21 to feed the combustor apparatus 1 with pulverized coal. A coal feeder 21a may preferably be mounted at the discharge port of the pulverized coal silo 21 to control the flow of pulverized coal to the injection duct 2 through the fuel supply passage 23. The main supply line 102 is connected in fluid flow relationship with the fuel supply passage 23, and supplies part of the air from the primary air supply 101 to mix with the pulverized coal being carried through the coal supply passage to form a air-fuel mixture A forced-draught primary air fan 22 mounted upstream in the fuel supply passage 23 moves the air, heated by the heating device 11, from the primary air supply 101 to the combustor apparatus 1. The heat of the air contributes to optimizing the reaction environment of the combustion chamber since the warmed-up air would help heighten fuel burning.

A burner unit 3 fires the combustor apparatus 1. A kerosene source supplies the burner unit 3 with kerosene. A pump 25 propels the flow of kerosene to the burner unit 3. Prior to operation, the burner unit 3 may be fired to heat the combustor apparatus 1 to optimum operating temperature. The combustor apparatus employed for partial coal burning according to the present invention may be the type illustrated in U.S. Pat. No. 4,217,132.

The partial combustion of fuel in such an apparatus will be touched upon briefly referring to FIG. 4 as well. The injection duct 2 supplies the mixture of pulverized bituminous or subbituminous coal from the pulverizer 17, blended with air from the fuel supply passage 23 and oxygen gas from its supply 13. The flow of the mixture through the tangential passage of the injection duct 2 develops, upon entering the combustion chamber of the combustor apparatus 1, into a rapidly swirling vortex, as illustrated in FIG. 4, and ignites in the heat from the burner unit 3. The vortex then undergoes partial combustion, at or near atmospheric pressure, burning at or above the ash fusion temperature, and generates high-temperature inflammable exhaust gases. Furthermore, the swirling movement would sustain sufficient residence time of fuel mixture in the combustion chamber enough to optimize burning. The molten ash and other non-combustible products present in the mixture, while rapidly swirling, would be caused to move outwardly in the reaction zone, eventually forming the outermost portion of the vortex in the combustion chamber. The liquid slag thus formed would be allowed to flow down along the curved inside surface of the combustor apparatus 1, and deposit at its bottom where it will be easily taken out through a tapping port 4.

The generated exhaust gases in the reaction zone will be very high in temperature and inflammable in terms of carbonaceous concentration, containing substantial quantities of incompletely burned by-products such as carbon monoxide and hydrogen, so that the gases can be recovered, after cooling and purification by a filter and a desulfurization unit, for use as useful fuel for boilers, metallurgical or other chemical processes. The high-temperature exhaust gases generated will be passed from the combustion apparatus 1 to a heat recovery boiler 27 mounted downstream of it via a coke dry quenching unit 26. The heat recovery boiler 27 will use the heat of the received exhaust gases to produce steam.

In the method of this invention, the coke dry quenching unit 26, which normally used to gas cool coke, is used only as an intermediate passage interconnected between the combustor apparatus 1 and the heat recovery boiler 27.

The heat recovery boiler 27 has a steam drum 30, and is connected via a pump 29 to a tank 28 which supplies pure water to the boiler.

The combustor apparatus 1 will produce exhaust gases of desirably high temperature and desired inflammability from the following operating requirements, which, of course, are suggested by way of illustration alone, and should not be regarded as providing any limitation to the scope of the present invention.

| | |
|---|---|
| Combustor operating pressure | 1.02 bars |
| Air preheat temperature at combustor inlet | 100° C.~300° C. |
| Coal flow rate | 20,000 kg/hr |
| Oxygen content in oxidizer gas | 30%~40% |
| Air-fuel equivalence ratio | 0.7~0.6 |
| Combustor outlet temperature | 1,600~1,700° C. |
| Exhaust gas CO content | 18~30% |
| Exhaust gas $H_2$ content | 3~7% |
| Exhaust gas heating value | 650~1,200 kcal/$Nm^3$, dry |
| Exhaust gas particulate concentration | 25~30 g/$Nm^3$ |
| Exhaust gas flow rate | 80,000~60,000 $Nm^3$/hr, dry |

A set of sensor means, not shown, may preferably be mounted either at the output areas of the combustor apparatus 1 or the entrance of the heat recovery boiler 27 to check various reaction conditions and the composition of the exhaust gases generated, to send information which may be used for feedback control of fuel, air or oxygen supply through the flow control valve 50 or the fuel feeder 21a. In addition, a flow control valve, now shown, may preferably be installed to control the flow of nitrogen gas through its supply line 141 leading from the supply 14, in response to comparison with one or more of the data obtained from the sensor set. Metered nitrogen gas supply also help optimize stored pulverized coal in an inert conditions.

After loosing portion of their heat to the heat recovery boiler 27, the recovered exhaust gases are moved to the cyclone separator 31 that is mounted downstream of the boiler. The cyclone separator 31 removes non-combustible substances from the received gases, such as fly ash and dust by the centrifugal effect. The cyclone separator 31 is connected at its exit to a four-way valve unit 33 which has three dampers 33a, 33b and 33c in three separate outlets. A circulating fan 32 may preferably be mounted to move the cleaned gases from the cyclone separator 31 to the four-way valve unit 33.

Part of the cleaned gases exiting the cyclone separator 31 is recycled through a recirculating passage 35 back to the coke dry quenching unit 26 where the cooled gases are allowed to blend with the high-temperature exhaust gases, just output from the combustor apparatus 1, moving in their way to the heat recovery boiler 27. This recycle is intended to provide control of the boiler operating temperature. The majority of the gases from the cyclone separator 31 will be passed via the four-way valve unit damper 33c to a bag filter 37 through a passage 33. The bag filter 37 is adapted to filter out the fine dust particles contained in the supplied gases, such as fly ash. Also, in case of emergency, such as accidental system shutdown or power failure, the emergency damper 33b will be opened to permit the escape of gases into the atmosphere through a primary stack 36.

A desulfurization unit 39 is connected through a passage 39a to the bag filter 37 to receive the dust-free gases therefrom. An induced-draught fan 38 is installed in the passage 39a to move the received gases to the desulfurization unit 39, which removes the sulfur or sulfur compounds contained in the received gases. The desulfurization unit 39 is connected at its output to a three-way valve unit 40 which has two dampers 40a and 40b in two separate outlets The three-way valve unit 40 is connected through its damper 40b to a gas recovery passage 41 which in turn leads to a recovery gas tank, not shown, through a recovery valve unit 43 and a V-shaped water sealed valve unit 44. The damper 40b is opened, with the other damper 40a closed, to permit the gas flow from the desulfurization unit 39 to the tank, provided the gases generated by the combustor apparatus 1 satisfy desired inflammability requirements for heat recovery. If not, the damper 40b is shut, and the damper 40a is opened to cause the gases from the desulfurization unit 39 to escape into the atmosphere through a secondary stack 42.

Part of the inflammable gases passed from the damper 40b are carried from the gas recovery passage 41 through a return line 45 to the preheater where the gases supplied are used as fuel. The ash and incompletely combusted products, such as carbon monoxides and hydrogen, that come to deposit in trays at the bottom of the coke dry quenching unit 26 and the heat recovery boiler 27, along with those collected from the cyclone separator 31 and the filter 37, such as fly ash and dust particles, are transferred through ash recovery passages to an ash bin 46. What is collected by the ash bin 46 will be transferred through a recycle passage 46a and the fuel passage 23, to which the recycle passage 46a is connected in fluid flow relationship, back into the combustion chamber for re-burning together with the new streams of fuel mixtures supplied into the combustion chamber. A forced-draught fan 47 is mounted to move the flow through the recycle passage 46a into the fuel passage 23.

Figure 2:
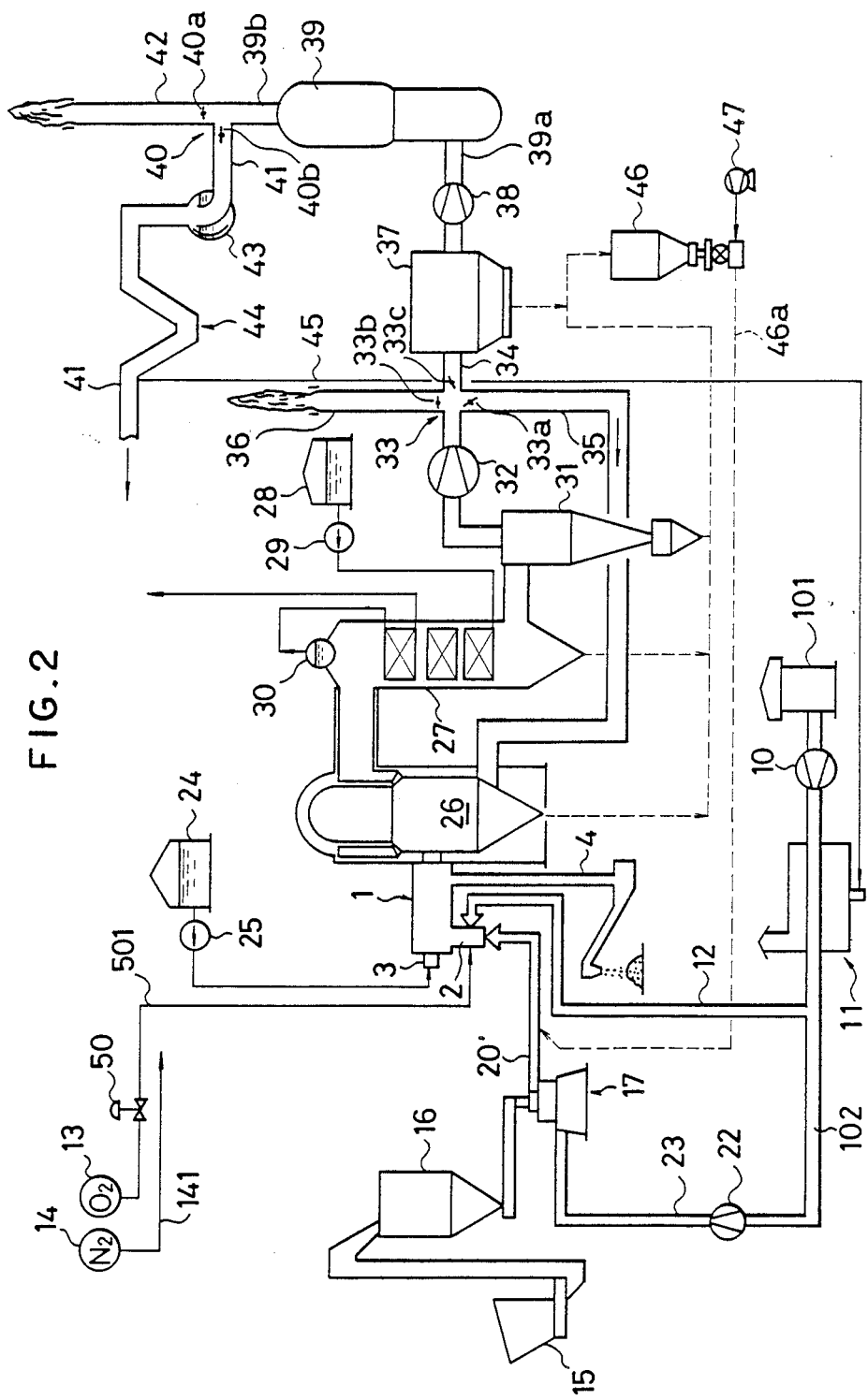
FIG. 2 is a diagramatic representation indicating a similar system to FIG. 1, but with a major modification made in the pulverized fuel supply system, in accordance with the present invention.

FIG. 2 is a diagrammatic view of a heat recovery system similar to FIG. 1, but with some changes in the structure, constructed in line with a second version of the method of waste gas recovery according to the present invention. Major changes includes the elimination of both the pulverized coal silo 21 and the associated air passage 19 together with its fan 18 to move the pulverized coal from the pulverizer 17 to the silo 21. Other elements in the system of FIG. 2 are substantially similar to their counterparts of the previous structure, and are referred to by like numbers. Description of these parts is omitted here to avoid unnecessary repetition since they are already explained in association with FIG. 1. The coal pulverizer 17 is directly coupled to the injection duct 2 through a fuel passage 20, and receives primary air from its source through the air passage 23. The paired forced-draught fans 10 and 22 connected in tandem along the passage 23 move the pulverized coal from the pulverizer 17 to the injection duct 2. The fuel passage 20' may also be coupled to the ash bin 46 to receive the ash and incompletely combusted products therefrom and supply them through the injection duct to the combustor apparatus for recombustion with the new streams of pulverized coal from the pulverizer 17.

The injection duct 2 also receives oxygen gas from its source 13 and primary air, following heating by the preheater 11, from its source 101 through the air passage 12. The processes after the heat recovery boiler 27, along with the pulverization and supply of coal, are substantially similar to the previously described system, will not be explained for brevity' sake.

Referring then to FIG. 3, a further version of the method of waste gas recovery through partial coal combustion in a combustion furnace 1 which is directly coupled to a heat recovery boiler 27', will be described in accordance with the present invention. The illustrated system is a simplified modification of FIG. 1, and similar components are referred to by like numbers, some of which with an apostrophe attached thereto. Except where parts in FIG. 3 differ significantly from their counterparts in FIG. 1, they will not be explained here.

The gases of high inflammability in terms of carbonaceous concentration generated from the partial combustion of pulverized coal and oxidizer gas, enriched with oxygen gas, in a rapidly swirling vortex over a short period of time, are sent to the associated heat recovery boiler 27' in which the heat of the high-temperature gases may be recovered through a thermal convection surface 48 that forms downstream portion of the boiler After losing portion of their heat to the thermal convection surface 48 of the heat recovery boiler 27', the exhaust gases are supplied to the heater 11' where the residual heat of the received gases is further used to heat the air from the primary air supply 101.

The gases of high inflammability are then passed to the bag filter 37' which in turn removes the dust particles from the supplied gases before they are sent to the desulfurization unit 39'. The gases, after being purified of their sulfur and sulfur compounds by the desulfurization unit 39', are then passed to a waste gas tank, not shown, moved by the induced-draught fan 38'. When the exhaust gases output from the combustor apparatus 1 are found to show a desired inflammability, the damper 40a of the three-way valve unit 40' is opened to permit them to escape into the atmosphere through the stack 42', with the other damper 40b closed. When the gases reached the level, the damper 40a is shut while the damper 40b is opened to cause the gases to flow through the gas recovery passage 41 into the recovery valve unit 43' and the water-sealed V-shaped valve unit 44'.

The ash and incompletely burned combustible products generated by the heat recovery boiler 27', the heater 11' and the bag filter 37', along with those collected by the ash bin 46', such as fly ash, are recycled through the air passage 23, moved by the forced-draught fan 47', into the combustor apparatus 1 to be burned, together with the new streams of fuel mixtures introduced into the combustion chamber. The received gas from bag filter 37' are fed to the desulfurization unit 39' which in turn removes the sulfur compounds or sulfur from the gases. The purified gases are then forced by an induced-draught fan 38' to move toward the three-way valve unit 40' and then into the gas recovery passage 41.

What is claimed is:

1. A method of recovering high-temperature inflammable exhaust gases, comprising the steps of:
    blending a mixture of pulverized coal and enriched air with oxygen as oxidizer gas, injecting the mixture together through a single tangential injection duct into a single, substantially horizontally arranged substantially cylindrical reaction chamber of a combustor apparatus, to develop a rapidly swirling vortex in the chamber;
    igniting the mixture, while the same is rapidly swirling, to undergo partial combustion in the chamber over a short period of time to generate exhaust gases;
    using the sensible heat of the generated exhaust gases in a heat exchange system or boiler; and
    purifying the exhaust gases, after losing a portion of their sensible heat to the heat exchange system or boiler, with a filter and a desulfurization unit; and
    recovering the purified gases.

2. A method as set forth in claim 1, comprising the step of varying the rate of oxygen gas to be blended with the mixture.

3. A method as set forth in claim 1, comprising the steps of:
    guiding the exhaust gases through a passage into a coke dry quenching unit for heat recovery; and
    recovering the gases after being cooled by using their sensible heat in the heat exchange system or boiler.

* * * * *